United States Patent [19]
Zettler

[11] Patent Number: 5,990,647
[45] Date of Patent: Nov. 23, 1999

[54] EMBEDDED SELF-TEST FOR RAIN SENSORS

[75] Inventor: Gerard J. Zettler, Winona, Minn.

[73] Assignee: Kelsey-Hayes Co., Livonia, Mich.

[21] Appl. No.: 09/182,717

[22] Filed: Oct. 29, 1998

[51] Int. Cl.$^6$ .............................. G05B 5/00; B60S 1/00; B60S 1/08

[52] U.S. Cl. .......................... 318/483; 318/443; 318/444; 318/480; 318/DIG. 2; 15/250.1; 15/250.2

[58] Field of Search ................... 318/480–484, 318/440–448, DIG. 2; 15/250.13, 250.1, 250.2, 250.16; 340/602, 438, 601, 439

[56] References Cited

U.S. PATENT DOCUMENTS

| | | |
|---|---|---|
| 4,620,141 | 10/1986 | McCumber et al. . |
| 4,701,613 | 10/1987 | Watanabe et al. . |
| 4,798,956 | 1/1989 | Hochstein . |
| 4,859,867 | 8/1989 | Larson et al. . |
| 4,867,561 | 9/1989 | Fujii et al. . |
| 4,871,917 | 10/1989 | O'Farrell et al. . |
| 4,942,349 | 7/1990 | Millerd et al. ............................ 318/483 |
| 4,956,591 | 9/1990 | Schierbeek et al. ..................... 318/483 |
| 4,960,996 | 10/1990 | Hochstein . |
| 4,973,844 | 11/1990 | O'Farrell et al. . |
| 5,057,754 | 10/1991 | Bell ......................................... 318/483 |
| 5,059,877 | 10/1991 | Teder . |
| 5,157,312 | 10/1992 | Wallrafen ................................. 318/264 |
| 5,239,244 | 8/1993 | Teder . |
| 5,252,898 | 10/1993 | Nolting et al. ........................... 318/444 |
| 5,255,442 | 10/1993 | Schierbeek et al. . |
| 5,262,640 | 11/1993 | Purvis et al. . |
| 5,276,389 | 1/1994 | Levers ...................................... 318/444 |
| 5,386,111 | 1/1995 | Zimmerman . |
| 5,412,296 | 5/1995 | Chien et al. . |
| 5,428,277 | 6/1995 | Stanton . |
| 5,432,415 | 7/1995 | Ittah et al. . |
| 5,436,541 | 7/1995 | Mangler et al. ......................... 318/483 |
| 5,453,670 | 9/1995 | Schaefer . |
| 5,453,676 | 9/1995 | Agrotis et al. . |
| 5,459,380 | 10/1995 | Augustinowicz . |
| 5,493,190 | 2/1996 | Mueller . |
| 5,506,483 | 4/1996 | McCann et al. . |
| 5,506,595 | 4/1996 | Fukano et al. . |
| 5,508,595 | 4/1996 | Schaefer . |
| 5,556,493 | 9/1996 | Teder et al. . |
| 5,560,245 | 10/1996 | Zettler et al. . |
| 5,568,027 | 10/1996 | Teder ...................................... 318/483 |
| 5,684,464 | 11/1997 | Egger ...................................... 340/602 |

*Primary Examiner*—Paul Ip
*Attorney, Agent, or Firm*—Harness, Dickey & Pierce

[57] ABSTRACT

A sensor for detecting moisture on an outside surface of a windshield is disclosed. The sensor includes an emitter circuit for emitting light energy, and a detector circuit for receiving light energy. A processor controls the emitter circuit and processes signals received from the detector circuit. A self test circuit is connected between the processor and the emitter circuit, the self test circuit is operably associated with the emitter circuit for generating a test signal for simulating the presence of moisture on the outside surface of the windshield.

20 Claims, 4 Drawing Sheets

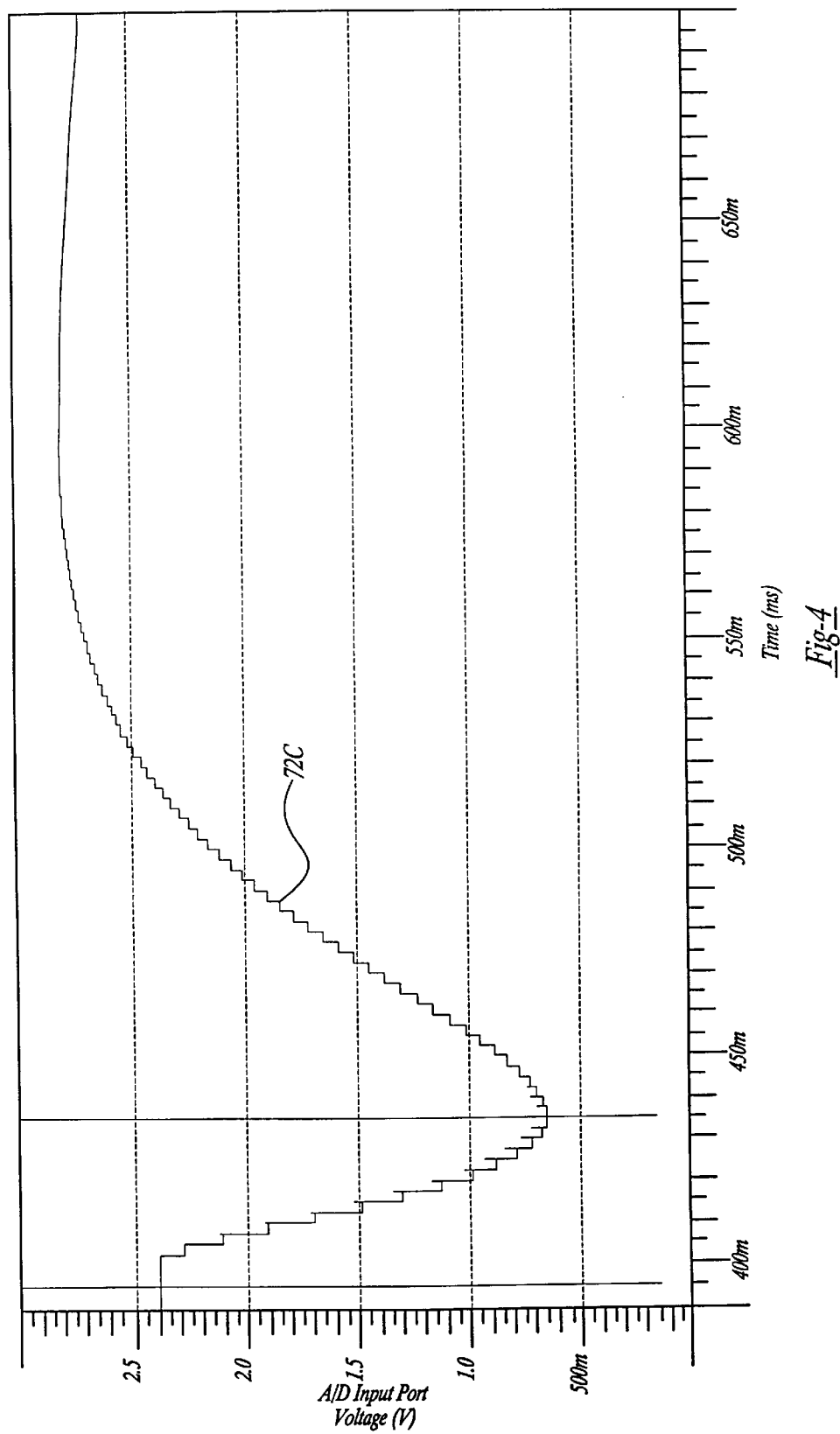

EMBEDDED SELF-TEST FOR RAIN SENSORS

BACKGROUND OF THE INVENTION

1. Technical Field

The present invention generally relates to a moisture sensor for moisture-activated windshield wiper control systems. More particularly, the present invention is directed to an electronic circuit and technique for testing the operation of the moisture sensor.

2. Discussion

Moisture activated windshield wiper systems are increasingly being incorporated into automobiles as standard equipment. Windshield wiper systems of this type typically include an optical sensor (infrared or visible spectrum) which is aimed at or mounted to the windshield, and electronic circuitry including a processing circuit for processing signals from the optical sensor to detect the presence of water droplets or moisture on the windshield. In operation, these systems direct light energy toward the outside surface of the windshield through an optical path. The optical path includes a photoemitter, a photodetector, and a quantity of radiation internally reflected at the windshield/air interface on the windshield surface. The rain sensing processing circuit generally includes electrical gain, frequency filtering, and other means to discriminate the desired rain stimulus. The output of the processing circuit controls the wiping frequency and speed of the windshield wiper motor in response to the amount of water detected on the windshield surface. A windshield wiper system of this type is shown in U.S. Pat. No. 5,059,877 to Teder, the disclosure of which is incorporated herein by reference.

The presently known rain sensors typically include one or more radiant energy sources such as infrared LED's, and optical means such as a collimating lens, a detector or focusing lens, and photodetector receivers to form a target area on the windshield surface which is sensitive to water droplets or moisture. A system of this type is described in U.S. Pat. No. 4,620,141 to McCumber et al. The McCumber patent described a moisture sensor system where a water droplet within the target area results in a change in the effective angle at which the light strikes the air/water surface. This operation is based upon the principle that air has a different refractive index than water and allows more of the light to escape from the windshield surface.

The above referenced Teder patent teaches that the strength of the signal returning to the photodetectors may be detected, and this detected signal may be used for appropriately changing the intensity of the photoemitters, allowing the system to function as a constant signal-to-noise device. The method of the Teder patent further teaches a rain sensing control circuit that provides for automatic LED current adjustment to compensate for changes in the transmittance of different windshields. The Teder system provides this automatic LED adjustment by regulating the average current in the photodetector devices. The Teder system also provides an automatic rain sensing system that is self-calibrating, allowing use on windshields having varying optical transmissivity characteristics.

However, as part of the Teder system, the current in the individual photodetectors will not be identical due to variation in optical and electrical gain parameters. Thus, the area and sensitivity to rain of the target areas will vary from channel to channel. As will be appreciated, a problem occurs if one or more of the optical target areas varies greatly in sensitivity or gain relative to the other optical target areas. When this problem condition occurs, the circuit taught by Teder will adjust the variable intensity pulse generator that drives the photoemitters, to the point where the average current though the photodetectors is equal to a level set by a predefined reference voltage. Thus, the average current in the photodetectors is regulated to a reference level, but the current in each individual photodetector will vary. The individual optical target areas corresponding to these photodetectors will therefore vary in their sensitivity to rain. For example, if the rain sensing system consists of four optical target areas and two of the target areas are completely nonfunctional, the Teder circuit will increase the current in the remaining two optical target areas, greatly increasing their sensitivity, in an effort to compensate for the two nonfunctional target areas. However, this technique can only partially compensate for the loss of the two targets, since the available target area for detecting water droplets will be greatly reduced in a system with two nonfunctional target areas.

In view of the above problems associated with the prior art rain sensors, it is desirable to provide a moisture sensing system which includes a self test feature for accurately determining whether the individual optical target areas are functioning properly. It is also desirable that this self test feature is integrated within the existing moisture sensing circuitry. It is further desirable that the moisture sensor have the capability to notify either the vehicle driver or service technician that the moisture sensing system is not functioning properly.

SUMMARY OF THE INVENTION

The present invention describes a circuit that determines whether each individual target is functional and whether each target has the appropriate sensitivity for detecting moisture or rain. This feature allows the microcomputer in the rain sensor to make the decision of whether the rain sensor is capable of correctly sensing raindrops and/or moisture at the proper sensitivity level.

The foregoing features and objects of the invention are achieved by periodically modulating the radiant energy sources, typically IR light emitting diodes, with a percentage change from the normal operating current at which the radiant energy sources are being pulsed. The modulation of the operating current in the photoemitter results in a change in the amount of light energy returning to the photodetectors. This change in energy simulates the effect of a water droplet on the windshield surface. The change in the amount of light energy being received by the photodetector results in a change in photocurrent in that device, which is processed and amplified by the rain sensing detection circuit. The output signal of the rain sensing detection circuit is monitored by a microcomputer with an onboard A/D circuit or by other voltage measuring means to determine the amount of signal returned to the photodetector. The amount of signal returned is evaluated to determine the overall condition of the rain sensing optical means and the rain sensing detection circuit, and thus the ability of the sensor to properly detect rain.

Accordingly, it is the principal object of the invention to provide an improved and more reliable moisture responsive windshield wiper control system.

Another object of the invention is to provide a moisture responsive windshield wiper control system that can be quickly and accurately evaluated by an automotive dealer to determine if the moisture responsive wiper system has the correct sensitivity to rain, without the use of any specialized test equipment.

Another object of the invention is to provide an accurate method of testing the rain sensor within a moisture responsive windshield wiper control system, without the use of external optical measuring devices.

A further object of the invention, is to provide a control system for a moisture responsive windshield wiper control system which will monitor its ability to sense rain, on power up, and revert to a standard pulse wipe or steady slow speed operation, if that ability to sense rain is compromised.

BRIEF DESCRIPTION OF THE DRAWINGS

Additional objects, advantages and features of the present invention will become apparent from the following description and appended claims, taken in conjunction with the accompanying drawings in which:

FIG. 4 is a waveform diagram of an analog signal received by the filtering and A/D circuitry associated with the rain sensor of the present invention.

DETAILED DESCRIPTION OF THE PREFERRED EMBODIMENTS

Disclosed is a moisture responsive windshield wiper system 10 that provides the ability to perform a self test function to determine if the rain sensor has the correct sensitivity to rain, without the requirement of external test equipment. The moisture responsive windshield wiper system 10 also has the capability to alert the vehicle operator or a service technician of a malfunction, and allows for the system to revert to a standard pulse wipe method of operation or other override function, such as steady or intermittent speed operation if a malfunction occurs.

Figure 1:
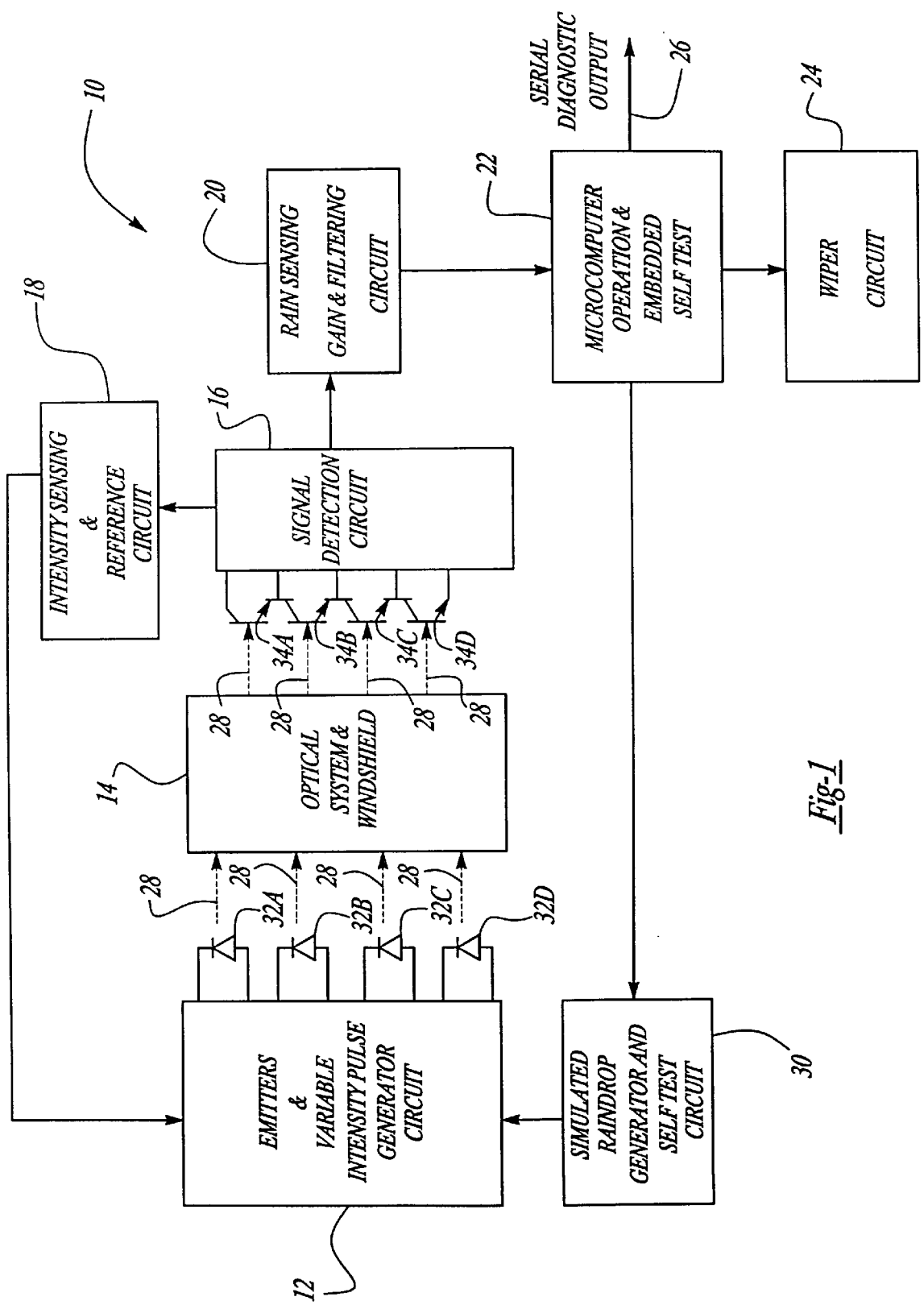
FIG. 1 is a block diagram of a rain sensor including a block for implementing the self test function in accordance with a preferred embodiment of the present invention.

Turning now to FIG. 1, a block diagram of a moisture responsive windshield wiper system 10 is shown which incorporates the simulated raindrop generator and self-test circuit 30 in accordance with the teachings of the present invention. Moisture responsive windshield wiper system 10 includes an emitter circuit 12 having a series of photoemitters 32A–32D for emitting infrared light energy. This infrared light energy is transmitted into an optical system 14 which generally includes a series of collimating lenses (one per photoemitter 32A–32D) for projecting the infrared light energy toward a windshield, and a corresponding set of focusing lenses for receiving and directing the infrared light energy which is internally reflected through the windshield, toward a series of photodetectors 34A–34D within a signal detection circuit 16. As one skilled in the art will appreciate, the optical system 14 can take on a variety of lens and windshield configurations, and more specifically may include several types of glass windshields including an infrared reflective windshield or a solar absorptive windshield. Light ray traces 28 represent the infrared light energy transmitted by emitter circuit 12 through the optical system and windshield 14 and toward signal detection circuit 16.

The infrared light energy transmitted by emitter circuit 12 is received by the photodetectors within signal detection circuit 16. The output of signal detection circuit 16 is provided to an intensity sensing and reference circuit 18 which includes a servo-driven circuit for controlling the voltage level for driving emitter circuit 12. The output from signal detection circuit 16 is also provided to rain sensing gain and filtering circuit 20 which includes a suitable circuit, described in greater detail below, for converting the current signal received from signal detection circuit 16 into a voltage output which is then provided to a microcomputer 22. Rain sensing circuit 20 includes a sample and hold circuit, gain and also filtering circuits. The sample and hold circuit samples the voltage on the input resistor 60 (FIG. 2) during the rain sense interval. The rain sense interval is the period of time when the photoemitters 32A–32D are energized. This signal is then amplified and filtered in a passband providing about 45 dB of gain between about one-half (0.5) Hz and 25 Hz.

Under normal operating conditions, microcomputer 22 is primarily responsible for detecting the presence of moisture on the outside surface of the windshield based upon changes in the voltage signals generated by rain sensing circuit 20. Microcomputer 22 is also responsible for actuating the simulated raindrop generator circuit 30 and thus operating the embedded self-test feature associated with a preferred embodiment of the present invention. To this end, the microcomputer 22 provides the appropriate drive signals to the simulated raindrop generator circuit 30 at the appropriate timing intervals. As shown in FIG. 1, one output (representing one or more control outputs) from microcomputer 22 is provided to the simulated raindrop generator circuit 30, which generates the simulated raindrop signals provided to emitter circuit 12. Based upon the various return signals received by microcomputer 22 via rain sensing circuit 20, the appropriate signals are outputted by microcomputer 22 to the vehicle's windshield wiper circuit 24. Additionally, microcomputer 22 includes a serial diagnostic output 26 which allows moisture responsive windshield wiper system 10 to be tested through external testing equipment during the manufacturing process, or allow microcomputer 22 to provide diagnostic information to the vehicle's information bus. One such bus for receiving this diagnostic information is the standardized SAE J1850 data bus which is now commonly found in many automotive vehicles.

Figure 2:
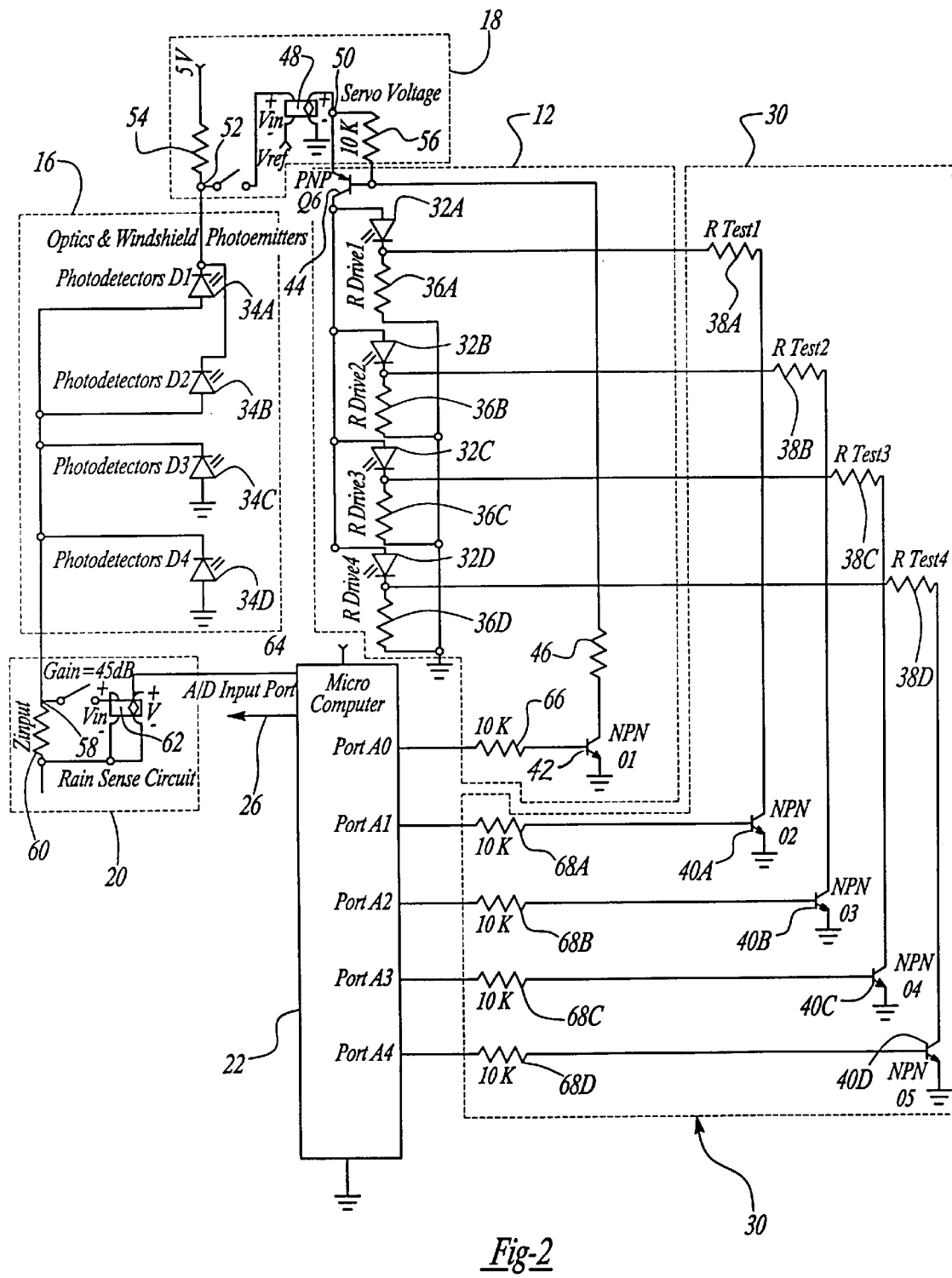
FIG. 2 is a schematic diagram of the rain sensor circuitry, including the circuit for implementing the rain sensor self test function, also in accordance with a preferred embodiment of the present invention.

Referring now to FIG. 2, a schematic diagram of rain sensor 10 is shown which further discloses the details associated with the functional blocks of FIG. 1. As shown, emitter circuit 12 includes four LED photoemitters 32A–32D. The anode of each photoemitter 32A–32D is connected to the servo-driven voltage source 48 provided by intensity sensing and reference circuit 18, and each cathode is connected to ground through a drive resistor 36A–36D (respectively).

The emitter and variable intensity pulse generator circuit 12 also includes an NPN transistor 42 having its collector coupled to the base of a PNP transistor 44 via a biasing resistor 46. The resistor 56 connected between the emitter and base of PNP transistor 44 serves as a pullup resistor to turn off Q44 when Q42 is turned off. The function of Q42 and Q44 is to supply the drive current for the photoemitters 32A–32D. Transistors 42 and 44 are operated by microcomputer 22 for providing and controlling the variable intensity pulsed signals for driving the photoemitters 32A–32D with the required amplitude as determined by the intensity sensing and reference circuit 18. A pulsed signal is preferred to a constant DC signal for extending the life span of the photoelectronics.

The simulated raindrop generator circuit 30 is closely associated with emitter circuit 12 in that four test resistors 38A–38D are also connected to the cathode of each photoemitter 32A–32D for providing a parallel current pathway to ground via a series of NPN control transistors 40A–40D. The operation of the individual transistors associated with simulated raindrop generator circuit 30 will be described in greater detail below.

The intensity sensing and reference circuit 18 includes a servo-voltage circuit 48 having a voltage output node 50 and a feedback voltage input node 52. A resistor 54 converts the current conducted through signal detection circuit 16 into an analog feedback voltage which is utilized by servo-voltage circuit 48. Accordingly, servo-voltage circuit 48 is feedback controlled by the resulting voltage level received on input node 52. As will be appreciated, the servo-voltage circuit 48 operates in conjunction with the variable intensity pulse generator portion of emitter circuit 12 for driving the photoemitters 32A–32D with the required current level intensity as determined by the feedback signal sent to the intensity sensing and reference circuit 18 by signal detection circuit 16.

The variable intensity pulse generator of emitter circuit 12 is constantly being adjusted by servo-voltage circuit 48 to keep the level of current flowing through the photodetectors 34A–34D, and therefore the amount of infrared light energy transmitted into the optical system 14 to the photodetectors at a constant level. One reason for including the servo-voltage circuit 48 is that the photoemitters 32A–32D and photodetectors 34A–34D have a considerable variation in their infrared light energy output with a given input current, and operating current for a given input of radiation (received through optical system 14), respectively. The details associated with servo-voltage circuit 48 are more particularly described in U.S. Pat. No. 5,059,877 to Teder, previously incorporated by reference.

With continued reference to FIG. 2, signal detection circuit 16 is shown to include four photodetectors 34A–34D which are connected in a bridge configuration. As an alternate configuration, only two photodetectors can be used for receiving the signals from the four photoemitters 32A–32D. As part of the alternate configuration, the focusing lenses within optical system 14 are modified for combining two of the received infrared light energy signals and focusing these combined signals onto a single photodetector. In either configuration, the photodetectors 34A–34D are positioned to receive infrared light energy which is internally reflected from the outside surface of the vehicle's windshield associated with optical system 14. As discussed above, this infrared light energy is transmitted by the photoemitters 32A–32D. In the preferred embodiment, moisture responsive windshield wiper system 10 includes four photoemitters 32A–32D and four photodetectors 34A–34D for creating four separate target areas for sensing moisture on the windshield's outside surface. An increased amount of infrared light energy received by either of the photodetectors 34A–34D in the top of the bridge will appropriately increase the amount of current flowing through signal detection circuit 16. This increased current simultaneously flows through rain sensing gain and filtering circuit 20. More specifically, this current flows through an input resistor 60 for creating a variable voltage at node 58 which is then detected by sample and hold, gain and filtering circuit 62. The amplified analog voltage outputted from gain and filtering circuit 62 is provided to the A/D input port 64 of the microcomputer 22. The rain sensing gain and filtering circuit 20 amplifies the rain signal present at the photodetectors 34A–34D, and has an appropriate frequency response for the proper detection of the rain pulses. The microcomputer 22 per forms the A/D conversion on the resulting rain sense voltage signal and analyzes and grades these waveforms.

As best show n in FIG. 2, the emitter and variable intensity pulse generator circuit 12 provides the switching functions for moisture responsive windshield wiper system 10 during normal operation via transistors 42 and 44. More specifically, port A0 of the microcomputer 22 is connected to the base of transistor 42 via a resistor 66. During normal operation, microcomputer 22 drives the base of transistor 42 with the current resulting from applying a suitable digital voltage level to resistor 66 which places transistor 42 into a current conducting state. This resulting current flowing through transistor 42 and resistor 46 biases transistor 44 into a current conducting state, which in turn causes each of the photoemitters 32A–32D to begin transmitting a pulse of infrared light energy. Microcomputer 22 typically pulses transistor 42 on for forty microseconds and off for 2.5 milliseconds, a 400 Hz, 1.6% duty cycle signal. This current is amplified by transistor 42 and accordingly drives transistor 44.

Transistor 44 is primarily responsible for supplying the drive current to the photoemitters 32A–32D. As shown, the emitter of transistor 44 is connected to the output node 50 of servo-voltage circuit 48. The voltage output on node 50 is constantly adjusted by the servo circuit 48 for driving photoemitters 32A–32D and maintaining the average current in the photodetectors 34A–34D at a desired setpoint. The servo-voltage circuit 48 is able to maintain this average current at a desired setpoint by receiving the voltage feedback signal from detector circuit 16 on input node 52. Accordingly, the servo-voltage on node 50, and thus the current through the resistors 36A–36D, is adjusted to compensate for the overall gain of the photodetectors 34A–34D, photoemitters 32A–32D, collimating and focusing lenses, and windshield transmissivity. As will be appreciated, this adjustment of the servo-voltage on node 50 for maintaining a desired current level occurs throughout the normal operation of moisture responsive windshield wiper system 10.

In operation, it is contemplated that the self-test feature associated with the present invention is implemented each time the vehicle is started. The implementation of this function is controlled by microcomputer 22 which activates the switching circuitry of the simulated raindrop generator circuit 30. The simulated raindrop generator circuit 30 provides the required switching function during the self test operation via control transistors 40A–40D. Ports A1–A4 are each connected to the respective bases of transistors 40A–40D via resistors 68A–68D. As part of the self-test feature, a simulated raindrop test pulse signal is applied to each of the four optoelectric channels, one channel at a time, which allows each channel to be tested in isolation to verify whether it is functioning properly. While each channel is separately tested in the same manner, only the test for one of the optoelectric channels will be described in detail herein. For example, in order to test optoelectric channel one which comprises photoemitter 32A and photodetector 34A, microcomputer 22 outputs a pulse through port A1 to the base of transistor 40A. It should be understood that during this time, continuous pulsing is applied by port A0 for turning on transistors 42 and 44. The resulting current flowing through resistor 68A is then amplified by transistor 40A and results in the collector of transistor 40A saturating and approaching 0.2V. Turning transistor 40A on places the test resistor 38A in parallel with the drive resistor 36A and increases the amount of current flowing through photoemitter 32A by a known percentage. This in turn changes the amount of infrared light energy emitted by photoemitter 32A, the amount of light energy transmitted internally through the windshield glass, the amount of light energy reflected from the outside windshield surface, and the amount of light energy returning to photodetector 34A. This change in current is converted to an analog voltage by input resistor 60, is sampled, held, amplified and filtered by the gain and filtering circuit 62, and is finally sampled as an analog voltage pulse at the A/D input port 64 of the microcomputer 22.

The microcomputer 22 then performs an analog-to-digital conversion on this voltage and compares the resulting binary value with a limit that has been preprogrammed into the microcomputer 22. If the signal obtained from input port 62 is larger than the calculated limit, optoelectric channel one passes the self test and is considered to be functioning properly. However, if the signal obtained from input port 64 does not meet the self test passing threshold, then optoelectric channel one is considered to be non-functioning. This test procedure is then repeated for optoelectric channels two through four.

As part of the preferred embodiment, it is contemplated that the moisture responsive windshield 10 can operate normally with only three of the four rain sensor optoelectric channels functioning properly without it being necessary to notify the vehicle operator. Accordingly, if only three optoelectric channels are functioning properly, a diagnostic message can be sent to the vehicle's diagnostic computer and the fault can be examined the next time the vehicle is brought in for service. However, if two or more optoelectric channels fail to pass the self test, the vehicle operator is notified, preferably upon vehicle startup, that the moisture responsive wiper system 10 requires immediate service, or the system reverts to an intermittent or steady slow manual operation.

Figure 3:
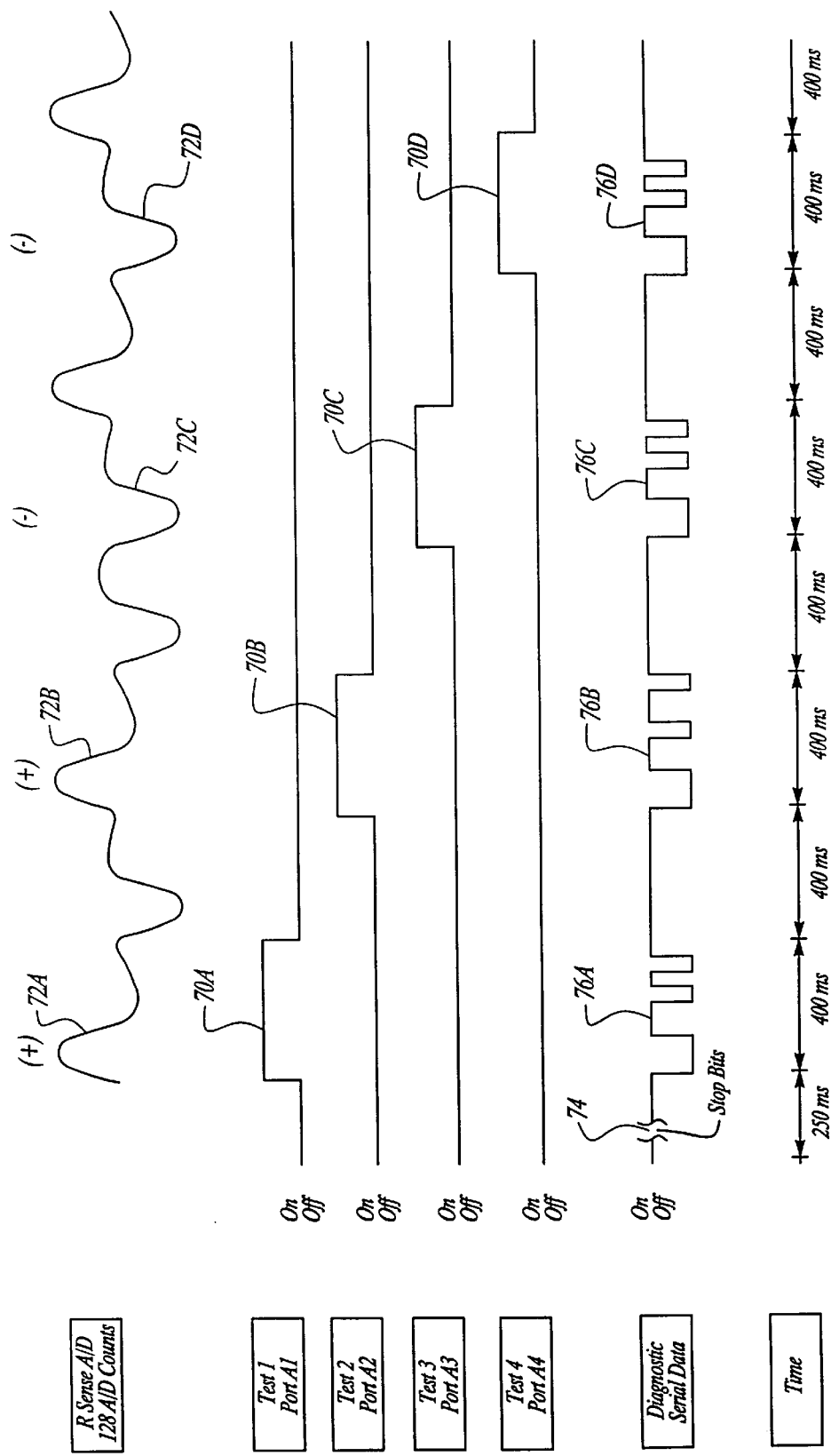
FIG. 3 is a signal timing diagram showing signals produced by the self test circuit according to the teachings of the present invention.

Turning now to FIG. 3, a signal diagram shows the timing of the signals generated by the microcomputer 22 for completing one self test cycle of wiper system 10. As shown, digital pulse signals 70A–70D correspond to the outputs of ports A1–A4 of microcomputer 22 for turning transistors 40A–40D on and off. Each pulse signal is preferably a 5V signal which is outputted for a time period of 400 milliseconds. The microcomputer 22 pauses for an additional 400 milliseconds before outputting pulse signal 70B from port A2. As shown, this procedure continues until all four channels have been properly tested. Also shown in FIG. 3, is waveform segment 72A which corresponds to step input 70A. Waveform segment 72A represents the analog signal received on A/D input port 64. Waveform segments 72B–72D thus correspond with pulse signals 70B–70D. As shown, the waveform segments 72A–72D alternate between positive pulses and negative pulses, where waveform 72A is a positive pulse and waveform 72C is a negative pulse. The actual sampled data representing waveform segment 72C is shown in FIG. 4.

As an additional part of the present invention, serial diagnostic output port 26 is capable of generating a stream of serial data bits for providing diagnostic information with an external source including, but not limited to, the vehicle's diagnostic computer or an external testing device used during the manufacturing process. Prior to the self test function, a series of stop bits 74 which can be a variety of sequential data bits, are presented on serial diagnostic output 26. The stop bits 74 are then followed by a serial data segment 76A which may contain real time diagnostic information relating to the operation and performance of the moisture responsive windshield wiper system 10. The serial data bit streams 76A–76D illustrate four separate packets of information.

The self-test function associated with the moisture responsive wiper system 10 is a functional test of the optics, photoemitters, photodetectors and rain sense circuit portion of the wiper system 10. The self-test function requires two distinct modes of operation. The first mode is the run-time diagnostic mode. This mode is utilized during the normal operation of the rain sensor by the driver or the automobile dealer. The second mode is the external diagnostic mode, which is utilized only by the final production tester at the manufacturing facility.

The run-time diagnostic mode is implemented as follows. Upon powering up the rain sensor circuit 10 after being off, or when placed into any automatic mode, the rain sensor 10 will detect the presence of rain for a predetermined amount of time. If the microcomputer 22 determines it is raining, the self-test function will not be performed until the next power up. However, if no rain is detected, moisture responsive wiper system 10 will perform the self-test function as described above. If the self test passes, rain sensor circuit 10 operates in the normal operating mode as a rain sensing device. However, should the self-test function fail, the microcomputer 22 will signal the wiper circuit 24 to revert to a steady slow mode of operation for alerting the vehicle operator or service technician of the failure. Alternatively, the microcomputer 22 may also transmit the appropriate sensor fail message to the vehicle's diagnostic computer. For a rain sensor system with an intelligent serial interface, such as serial diagnostic output 26, the appropriate sensor fail code message could be transmitted to the vehicle's diagnostic computer. The wiper control circuit 24 will subsequently act upon this information, reverting to an intermittent or steady slow manual operation.

The discussion presented herein discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A sensor for detecting moisture on an outside surface of a windshield, said sensor comprising:
   an emitter circuit for emitting light energy;
   a detector circuit for receiving light energy;
   a processor for controlling the emitter circuit and processing signals received from the detector circuit; and
   a self test circuit connected between the processor and the emitter circuit, the self test circuit being operably associated with the emitter circuit for generating a test signal for simulating the presence of moisture on the outside surface of the windshield.

2. The sensor of claim 1 wherein the detector circuit generates a feedback signal for controlling a current level provided to the emitter circuit.

3. The sensor of claim 2 further including a servo controlled circuit for receiving the feedback signal and controlling a servo output voltage, said servo output voltage generating a current through a resistor associated with the emitter circuit.

4. The sensor of claim 1 wherein the self test circuit includes a plurality of switches for generating the test signal.

5. The sensor of claim 1 wherein the self test circuit includes a resistor connected to ground via a transistor, the processor being connected to the transistor for biasing the transistor between an on state and an off state.

6. The sensor of claim 1 wherein the light energy is infrared light energy.

7. The sensor of claim 1 wherein the emitter circuit includes a plurality of photoemitters for transmitting infrared light energy into the windshield.

8. The sensor of claim 1 wherein the detector circuit includes a plurality of photodetectors for receiving infrared light energy which is internally reflected from the outside surface of the windshield.

9. The sensor of claim 1 wherein the emitter circuit includes a photoemitter in series with a resistor for conducting current through the photoemitter, and wherein the photoemitter transmits infrared light energy into the windshield.

10. A rain sensor for detecting moisture on an outside surface of a windshield, said rain sensor comprising:

a photoemitter circuit for transmitting infrared light energy into the windshield;

a photodetector circuit for receiving light energy which is internally reflected from the outside surface of the windshield;

a processor for controlling the photoemitter circuit and processing signals received from the photodetector circuit;

a windshield wiper circuit connected to the processor for receiving control signals from the processor; and a self test circuit connected between the processor and the photoemitter circuit, the self test circuit including a resistor connected to ground via a transistor, the processor being connected to the transistor for biasing the transistor between an on state and an off state for generating a test signal for simulating the presence of moisture on the outside surface of the windshield.

11. The rain sensor of claim 10 wherein the photoemitter circuit includes four light emitting diodes for transmitting infrared light energy, each of the light emitting diodes being connected between a common voltage source and a resistor connected to ground.

12. The rain sensor of claim 11 wherein the photodetector circuit includes four photo diodes connected in a bridge configuration, the photodetector circuit providing a feedback signal to a servo controlled circuit for controlling the common voltage source and photo emitter circuit for maintaining a predetermined current level within the photodetector circuit.

13. The rain sensor of claim 10 wherein the processor includes an output port for transmitting data indicating the operation of the rain sensor.

14. The rain sensor of claim 13 wherein the output port is a serial data port.

15. The rain sensor of claim 13 wherein the output port is connected to a data bus for providing data to a vehicle controller.

16. The rain sensor of claim 10 wherein a sample and hold, gain and filtering circuit is disposed between the photodetector circuit and the processor.

17. A method for testing a rain sensor circuit for detecting moisture on the outside surface of a windshield comprising:

providing an emitter circuit for transmitting light energy, said emitter circuit including a photoemitter in series with a first resistor for conducting current through the photoemitter;

providing a detector circuit for receiving light energy;

providing a processor for controlling the emitter circuit and processing signals received from the detector circuit;

providing a self test circuit connected between the processor and the emitter circuit, the self test circuit including a second resistor in parallel with the first resistor, the second resistor being connected to ground via a transistor;

generating a pulse signal for biasing the transistor; and switching the transistor between an on state and an off state, the transistor changing the current through the photoemitter.

18. The method of claim 17 further including the step of controlling a current level provided to the emitter circuit based upon a feedback signal received from the detector circuit.

19. The method of claim 18 wherein a servo driven circuit receives the feedback signal for controlling the current level provided to the emitter circuit.

20. The method of claim 17 including the step of comparing a rain sense signal received from the detector circuit to a predetermined threshold for determining whether the emitter circuit and the detector circuit are functioning properly.

* * * * *